United States Patent [19]

Koumura

[11] Patent Number: 4,475,128
[45] Date of Patent: Oct. 2, 1984

[54] IMAGE RECORDING APPARATUS

[75] Inventor: Noboru Koumura, Narashino, Japan

[73] Assignee: Canon Kabushiki Kaisha, Tokyo, Japan

[21] Appl. No.: 354,601

[22] Filed: Mar. 4, 1982

[30] Foreign Application Priority Data

| Mar. 11, 1981 [JP] | Japan | 56-34714 |
| Mar. 11, 1981 [JP] | Japan | 56-34715 |
| Mar. 11, 1981 [JP] | Japan | 56-34716 |
| Mar. 11, 1981 [JP] | Japan | 56-34717 |
| Sep. 22, 1981 [JP] | Japan | 56-148797 |
| Sep. 22, 1981 [JP] | Japan | 56-148798 |

[51] Int. Cl.$^3$ ............................................. H04N 1/12
[52] U.S. Cl. .................................. 358/296; 271/225; 271/259; 358/293
[58] Field of Search ............... 358/296, 300, 304, 285, 358/293, 294; 271/225, 258, 259, DIG. 9

[56] References Cited

U.S. PATENT DOCUMENTS

| 2,933,557 | 4/1960 | Strickholm | 271/225 |
| 3,180,933 | 4/1965 | Shaler | 271/225 |
| 3,479,451 | 11/1969 | Regunberg | 358/304 |
| 3,936,041 | 2/1976 | Shiina | 271/225 |
| 3,988,062 | 10/1976 | Burton | 271/65 |
| 4,051,538 | 9/1977 | Fox | 358/296 |
| 4,134,135 | 1/1979 | Inokuchi | 358/293 |
| 4,189,754 | 2/1980 | Gamblin | 358/296 |
| 4,202,621 | 5/1980 | Yoshimura | 271/DIG. 9 |
| 4,300,758 | 11/1981 | Peter | 271/225 |
| 4,325,086 | 4/1982 | Sato | 358/296 |

Primary Examiner—Howard W. Britton
Attorney, Agent, or Firm—Fitzpatrick, Cella, Harper & Scinto

[57] ABSTRACT

An image recording apparatus capable of recording images on both faces of a recording sheet by a combination of image reading devices for reading both faces of the original in reciprocating scanning motion and recording devices for image recording on both faces of the sheet. The reading devices are capable of reading the original in either scanning direction, and the recording devices are capable of image recording corresponding to either image scanning direction.

30 Claims, 13 Drawing Figures

IMAGE RECORDING APPARATUS

BACKGROUND OF THE INVENTION

1. Field of the Invention

The present invention relates to an image recording apparatus capable of image recording not only on one face but also on both faces of a recording sheet.

2. Description of the Prior Art

There have been proposed various two-side recording apparatus for image recording on both faces of a recording sheet. In such apparatus, however, the use of a known electrophotographic process will lead to frequent jamming troubles in the apparatus because of the very long transport path for the recording sheet, and the apparatus itself inevitably becomes very large.

Also already known is an image recording apparatus in which an image is recorded according to image information read by relative displacement of an original image and a line sensor such as a linear charge-coupled device (CCD). In such apparatus, since the relative displacement between the original image and the line sensor is limited to one direction, the original image has to be brought again to the starting position in case it is to be read plural times.

Also recording apparatus using and ink jet process or thermal recording process requires a treated special recording sheet, for example for preventing ink blotting. For recording on both faces in such apparatus, there is required a two-side recording sheet which is treated on both faces and is therefore considerably more expensive than the one-side recording sheet. However the conventional recording apparatus, lacking means for selectively using the one-side and two-side recording sheets, has to use the expensive two-side recording sheet even in the one-side recording, thus giving rise to an elevated running cost.

SUMMARY OF THE INVENTION

In consideration of the drawbacks in the prior art, the object of the present invention is to provide an image recording apparatus capable of two-side image recording with a compact size and with a short transport path for the recording sheet.

Another object of the present invention is to provide an efficient original reading device for image scanning by displacement of the original, capable of reciprocating scanning of a single original.

Still another object of the present invention is to provide a two-side image recording apparatus composed of a combination of reciprocating image reading devices and a two-side recording device and not associated with the drawbacks resulting from said combination.

Still another object of the present invention is to provide an image recording apparatus capable of ejecting the recording sheets in the same direction regardless whether the original is read in forward displacement or in backward displacement.

Still another object of the present invention is to provide a two-side image recording apparatus capable of selectively using recording sheets for one-side recording and those for two-side recording.

The foregoing and still other objects of the present invention will be made fully apparent from the following description of the preferred embodiments.

DESCRIPTION OF THE PREFERRED EMBODIMENTS

Figure 1:
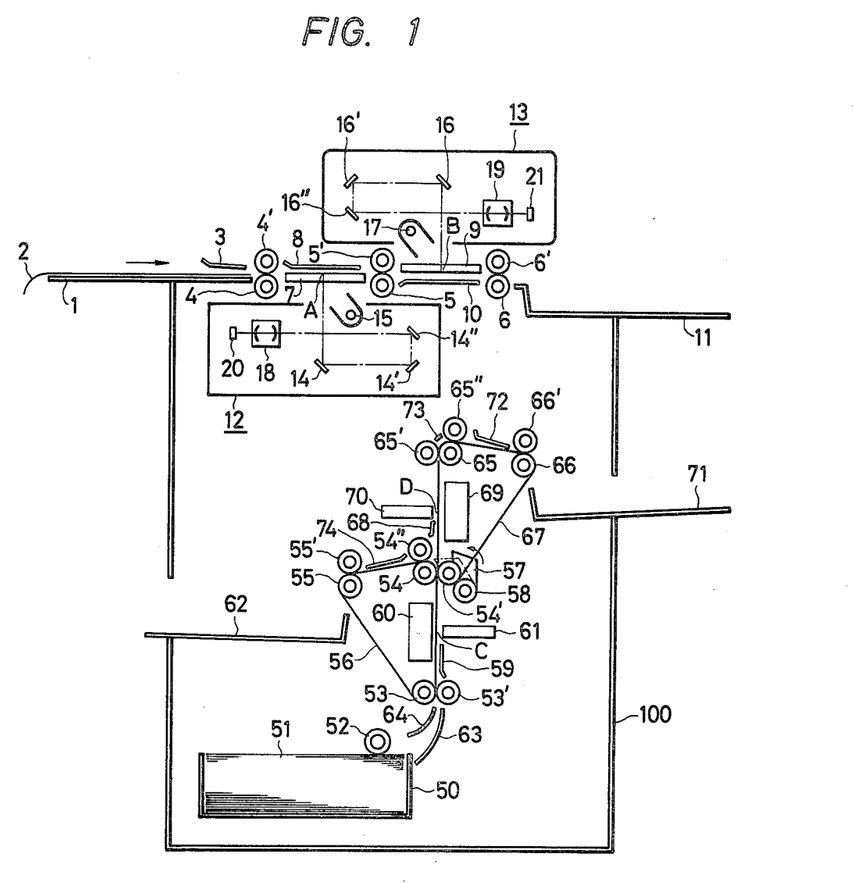
FIG. 1 is a cross-sectional view of an image recording apparatus capable of two-side recording and embodying the present invention.

FIG. 1 shows an image recording apparatus of the present invention in a cross-sectional view, wherein shown are an original guide 1, an original document 2, an upper original guide 3, original transport rollers 4, 4', 5, 5', 6, 6', a lower platen 7, a pressure plate 8, an upper platen 9, another pressure plate 10, and an original tray 11.

The original 2 inserted by the operator is guided by the original guide 1 and is further transported in a direction indicated by the horizontal arrow, by pinching between the original transport rollers 4, 4', 5, 5', 6 and 6'. During said transportation, the images on the lower and upper faces of the original 2 are respectively read at a point A on the lower platen 7 and at a point B of the upper platen 9 both positioned along the transport path. The original 2 after image reading is placed on an original tray 11.

The upper original guide 3 is so fixedly positioned that the original 2 is most adequately pinched between the transport rollers 4, 4'. Also the pressure plates 8, 10 are provided for proper focusing of the images on the original 2.

There are further shown a lower face reading unit 12, an upper face reading unit 13, mirrors 14, 14', 14'', 16, 16', 16'', light sources 15, 17, lenses 18, 19, and linear CCD image sensors 20, 21.

The above-mentioned point A is illuminated by the light source 15, and the light reflected by the image on the lower face of the original 2 passing through said point A is introduced into said image sensor 20 through a light path formed by said mirrors 14, 14', 14" and said lens 18. Also the point B is illuminated by the light source 17, and the light reflected by the image on the upper face of the original 2 is introduced into said image sensor 21 through a light path formed by the mirrors 16, 16', 16" and the lens 19.

Said image sensors 20, 21 convert thus introduced light into electric signals, which are electrically processed by an unrepresented processing circuit for image recording on a recording sheet in the following manner.

In FIG. 1 there are shown recording sheets 51, a cassette 50 containing said recording sheets, a sheet feeding roller 52, transport rollers 53, 54, 54', 55, 65, 66, nip rollers 53', 54'", 55', 65', 65", 66', belts 56, 67, a selecting claw 57, a shaft 58 for said selecting claw, guides 59, 63, 64, 68, 72, 73, 74, suction means 60, 69, ink jet recording heads 61, 70, and recording sheet trays 62, 71.

The recording sheet 51 is guided between the guides 63, 64 by the sheet feed roller 52, then pinched between the transport roller 53 and the nip roller 53' and transported along the belt 56 to a lower face recording position C, at which the recording head 61 performs image recording corresponding to the image signals read at the aforementioned point A. The sheet is further transported through the transport rollers 54, 54' to an upper face recording position D, at which the recording head 70 performs image recording corresponding to the image signals read at the aforementioned point B.

After image recording on both faces, the recording sheet 51 is transported through the transport roller 65, nip rollers 65', 65" then through the transport roller 66 and nip roller 66' to the recording sheet tray 71.

In the above-explained embodiment, the distance between the lower face recording position C and the upper face recording position D is selected equal to the distance between the point A on the lower platen 7 and the point B on the upper platen 8, so that the image recording on both faces can be conducted simultaneously with the image reading with a memory for storing the image signals read from the original.

In case the image recording is required on only one face of the recording sheet, the selecting claw 57 positioned above the transport rollers 54, 54' is rotated in the direction of the curved arrow to the broken-lined position about the shaft 58, whereby the leading end of the recording sheet 51, after image recording by the recording head 61 at said point C and after passing between the transport rollers 54, 54', is deflected to pass between said transport roller 54 and another nip roller 54" positioned above, then between the transport roller 55 and nip roller 55' and is ejected to the recording sheet tray 62.

In this manner the image recording on both faces is conducted by the recording heads 61 and 70, and the processed recording sheet is ejected on the tray 71, while the image recording on one face is conducted by the recording head 61 and the processed recording sheet is ejected on the tray 62.

Suction means 60, 69 for example composed of suction fans serve to maintain flatness of the recording sheet 51 and an optimum distance from the recording head 61 or 70 at the position C or D.

Rotatable belts 56, 57 serve as substrates for maintaining the recording sheet 51 in flat state in the point C, D and also as transport means therefor. Said belts can be replaced by fixed guide plates serving as substrates for achieving flat sheet state as will be explained later.

Guides 59, 63, 64, 68, 72, 73 and 74 are provided for achieving smooth transportation of the recording sheet 51.

Said ink jet recording heads 61, 70 are so-called full-multi heads, each having an array of ink jet nozzles arranged at least over the width of the recording sheet and in a direction substantially perpendicular to the transport direction of recording sheet, as disclosed for example in the U.S patent application Ser. No. 133,327 filed March 24, 1980 by N. Ayata et al., for "Droplet Generating Method and Apparatus Therefor", assigned to the assignee hereof.

The above-explained image reading unit and recording unit are housed in a casing 100.

As explained in the foregoing, the image recording apparatus of the present invention, having first and second recording units across the transport path of the recording sheet, does not require inversing or reversing thereof in two-side recording. Consequently it is rendered possible to provide a compact recording apparatus with a shortened transport path of the recording sheet and with reduced jamming troubles.

Also the use of an ink jet head as the recording unit eliminates bulky drive mechanisms usually required in the electrophotographic apparatus. Particularly the above-mentioned full-multi ink jet head allows one to completely eliminate drive mechanisms in the recording unit.

The first and second ink jet recording heads may be positioned in a mutually opposed relationship across the transport path, but a mutually spaced relationship as explained in the foregoing allows the use of a simple mechanism for maintaining a constant distance between the recording head and the recording sheet, thus achieving an improvement in the print quality of the image formed on the recording sheet.

As explained in the foregoing, the image recording apparatus of the present invention performs image recording on a first face of the recording sheet by a first ink jet head at a first position along the transport path of the recording sheet and on a second face thereof by a second ink jet head at a second position along said transport path, and is provided, between said first and second position, with switching means for either advancing said recording sheet to said second position for two-side recording or bypassing said second position to eject the recording sheet with image recording on one face only. Consequently the distance of sheet transportation in one-side recording is made much shorter than that in two-side recording, thus significantly reducing the possibility of sheet jamming. Also the use of different trays for one-side recording and two-side recording allows easy sorting of the sheets.

Also the so-called full-multi ink jet head employed in the foregoing embodiment may be replaced for example by a printing head having only one ink jet nozzle or having plural nozzles along the auxiliary scanning direction.

Figures 2, 3:
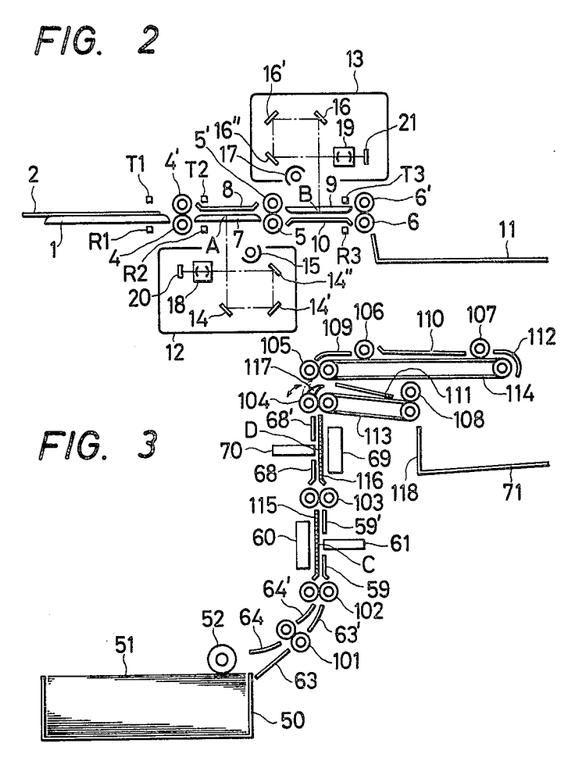
FIG. 2 is a cross-sectional view of an original reading unit capable of original reading in reciprocating motion.
FIG. 3 is a cross-sectional view of another embodiment of a recording unit.

FIG. 2 shows another embodiment of the image reading unit provided with a reciprocating image reading mechanism, wherein the components of the same function as those shown in FIG. 1 are represented by same numbers. The mechanism shown in FIG. 2 is however different from that shown in FIG. 1 in having three photocouplers, each composed of a light-emitting element and a photosensor, for detecting the original document in transportation.

In said reading unit, the image reading function is carried out in the following manner. Upon insertion of the original document 2 to the transport rollers 4, 4' and upon detection of said original document by a photocoupler composed of a light-emitting element T1 and a photosensor R1, the transport rollers 4, 4', 5, 5', 6 and 6' initiate rotation by an unrepresented motor to transport the original 2 between the lower platen 7 and the pressure plate 8. Then the leading end of the original 2 is detected by a photocoupler composed of a light-emitting element T2 and a photosensor R2, of which the detection signal is utilized as a synchronizing signal for the image recording as explained later. In the same manner as explained in FIG. 1, the images on the lower and upper faces of the original 2 are respectively at the points A and B. Upon further transportation of the original 2 after said image reading, the trailing end of said original 2 is detected by a photocoupler composed of a light-emitting element T3 and a photosensor R3. In case said original 2 is to be read only once, it is immediately ejected to the original tray 11. On the other hand, in case said original 2 is to be read plural times, the transport rollers 4, 4', 5, 5', 6 and 6' are inversely rotated in response to the output signal from said photocoupler T3, R3 to transport the original 2 in the opposite direction along the transport path, whereby the images on the upper and lower faces of the original 2 are read in this order respectively at the points B and A by the reading units 13 and 12. Upon detection of the trailing end of the original 2 in said opposite transport direction by the photocoupler T2, R2 after said image reading, the transport rollers 4, 4', 5, 5', 6 and 6' again initiate rotation in the normal direction. In this manner the transport rollers repeat rotations in the normal and inverse directions in response to the number of image readings instructed by an unrepresented counter, and the original 2 is finally ejected onto the original tray 11.

In case the original is to be scanned an even number of times, the original after final image reading is further transported by the rotation of said transport rollers in the normal direction toward the original tray 11, but it is also possible to eject such original onto the original guide 1.

FIG. 3 shows, in a cross-sectional view, an embodiment of the recording unit adapted for use in combination with the image reading unit capable of reciprocating image reading function as shown in FIG. 2. In FIG. 3, components of the same function as those in FIG. 1 are represented by same numbers and are omitted from the following description.

In FIG. 3 there are shown a registering roller 102, transport rollers 101, 103, 104, 105, 106, 107, 108, transport guides 109, 110, 111, 112, conveyor belts 113, 114, stationary perforated guide plates 115, 116 and a transport path selecting claw 117.

The function of the recording unit explained above is as follows. Upon detection of the original 2 by the photocouple T1, R1, the feed roller 52 and transport roller 101 initiate rotation to transport a recording sheet 51 to the registering roller 102 along the guides 63, 64. In response to the detection of the leading end of the aforementioned original 2 by the photocoupler T2, R2, said registering roller 102 initiates rotation to transport the recording sheet 51 between the guide plate 115 and the guide 59, whereby the image on the lower face of the original is recorded on a first face of said recording sheet 51 by a recording head 61 positioned at C, in response to the image signals from the image sensor 20 for reading the lower face of the original.

At said image recording the recording sheet 51 is maintained flat by suction caused by a suction fan 60 through the perforated guide plate 115, thus supported at a constant distance from the recording head 61. Then the recording sheet 51 is transported by the transport roller 103 to another recording position D, at which a recording head 70 records the image on the upper face of the original 2 onto a second face of the recording sheet 51 in response to the image signals supplied from the image sensor 21 for reading the upper face of the original.

As already explained in relation to FIG. 1, the distance between the points A and B is selected equal to the distance between the recording units C and D, so that two-side recording can be achieved without a memory for temporarily storing the output signals from the image sensors.

The switching claw 117 being in the full-lined position in this state, the recording sheet 51 bearing recorded images on the first and second faces is transported along the conveyor belt 113 and the guide 111 and is ejected onto the tray 71 with said second face upward. The above-explained procedure takes place when the original is read in the forward displacement.

In the image reading during the backward displacement of the original, in response to the detection of the leading end of the original 2 in said backward displacement by the photocouple T3, R3, the recording sheet 51 is transported by the feed roller 52 and transport roller 101 to the registering roller 102. Then, upon detection of the trailing end of the original 2 by the photocouple T3, R3, the original transport rollers 4, 4', 5, 5', 6, 6' initiate inverse rotation in the aforementioned manner, and the registering roller 102 simultaneously initiates rotation to advance the recording sheet 51 to the recording position C, at which the image on the upper face of the original 2 is recorded on the first face of the recording sheet 51. Then, at the recording position D, the image on the lower face of the original 2 is recorded on the second face of the recording sheet 51.

Thus, the recording heads used for recording the images on the upper and lower faces of the original are mutually exchanged during the backward displacement of said original.

Figure 4:
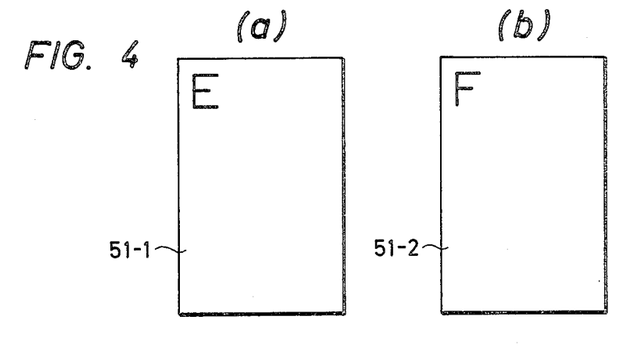
FIG. 4 is a view showing an example of image recording on a recording sheet during forward image scanning.
Figure 5:
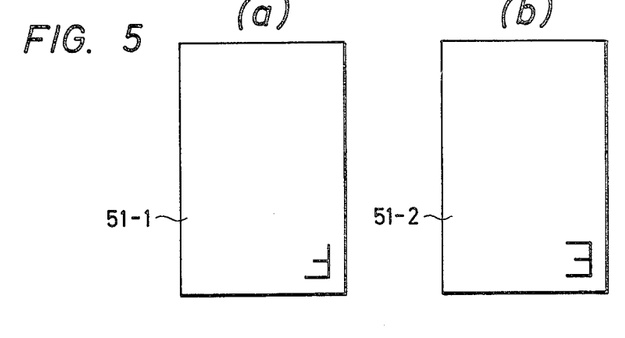
FIG. 5 is a view showing an example of image recording on a recording sheet during backward image scanning.

As an example, in case a character "E" and a character "F" are respectively recorded on the first face 51-1 and second face 51-2 of the recording sheet 51 as shown in FIG. 4 (a) and (b) in the forward displacement of the original, said characters are recorded respectively on the second and first faces in the backward displacement of the original as shown in FIG. 5 (a) and (b).

Consequently, if such recording sheet 51 recorded during the backward displacement of the original is ejected through the conveyor belt 111 in the same manner as in the case of image recording during the forward displacement of the original, the sheets stacked on the tray 71 will become alternately inverted with respect to the direction of sheet and of faces thereof. In the present embodiment, therefore, the switching claw 117 is displaced to the broken-line position for the recording sheet recorded during the backward displacement of the original, whereby said recording sheet 51 is transported along the conveyor belt 114 and is inverted by the bent guide 112 and a folded portion 118 of the tray 71.

Figure 6:
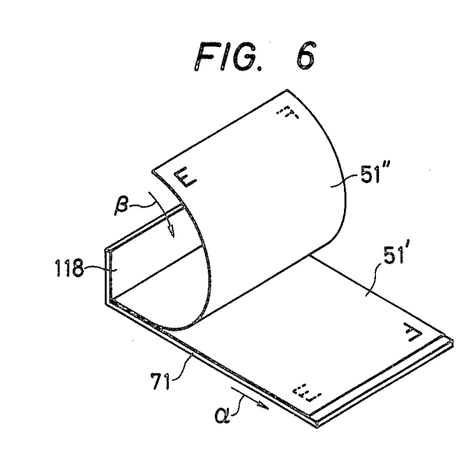
FIG. 6 is a view showing the stacking state of recording sheets on an eject tray.

Thus, as shown in FIG. 6, the recording sheet 51' recorded during the forward displacement of the original is ejected onto the tray 71 in a direction α, while the sheet recorded during the backward displacement of the original is ejected in a direction β, so that all the sheets stacked on the tray 71 are aligned with respect to the sheet direction and face direction.

Figure 7:
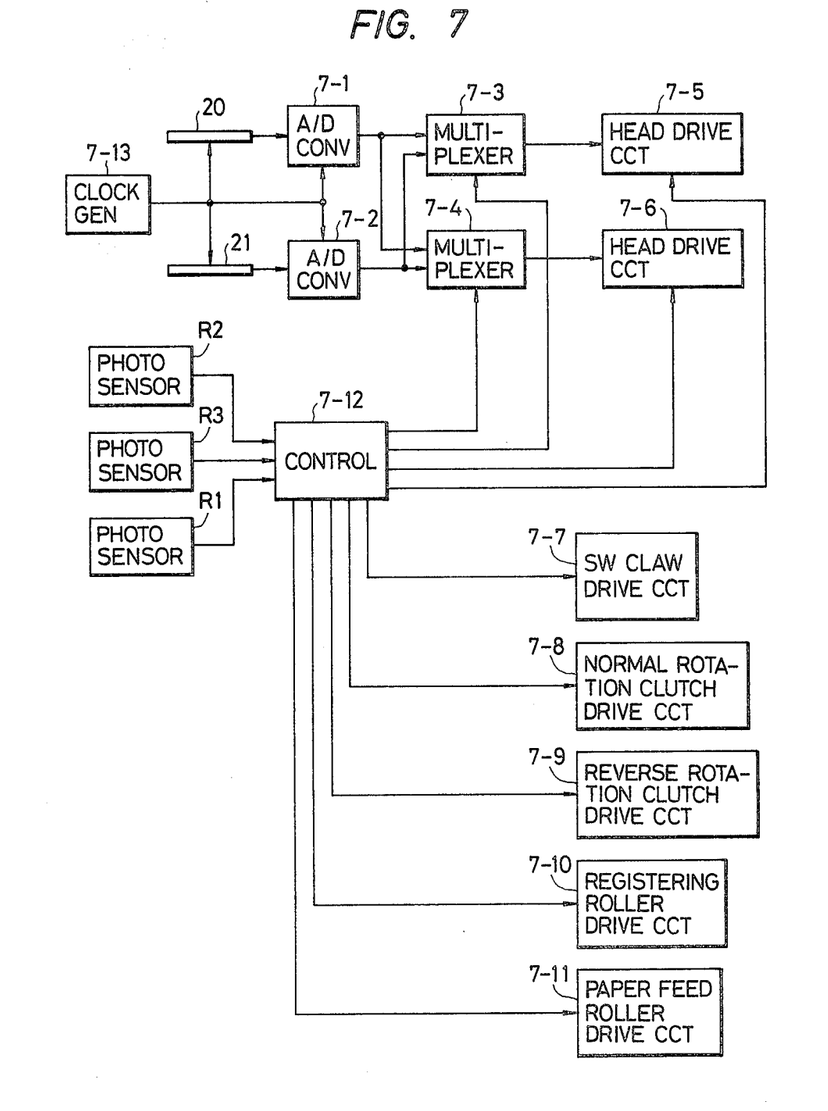
FIG. 7 is a circuit diagram of a control circuit for use in an embodiment employing the original reading unit shown in FIG. 2 and the recording unit shown in FIG. 3.

Now reference is made to FIG. 7 showing a control circuit adapted for use in an image recording apparatus utilizing the image reading units shown in FIG. 2 and the recording unit shown in FIG. 3, wherein illustrated are analog-to-digital (A/D) converters 7-1, 7-2; multiplexers 7-3, 7-4; recording head drive circuits 7-5, 7-6; a control unit 7-12; a switching claw drive circuit 7-7; a normal rotation clutch drive circuit 7-8; a reverse rotation clutch drive circuit 7-9; a registering roller drive circuit 7-10; a feed roller drive circuit 7-11; and a clock generator 7-13.

Figure 8:
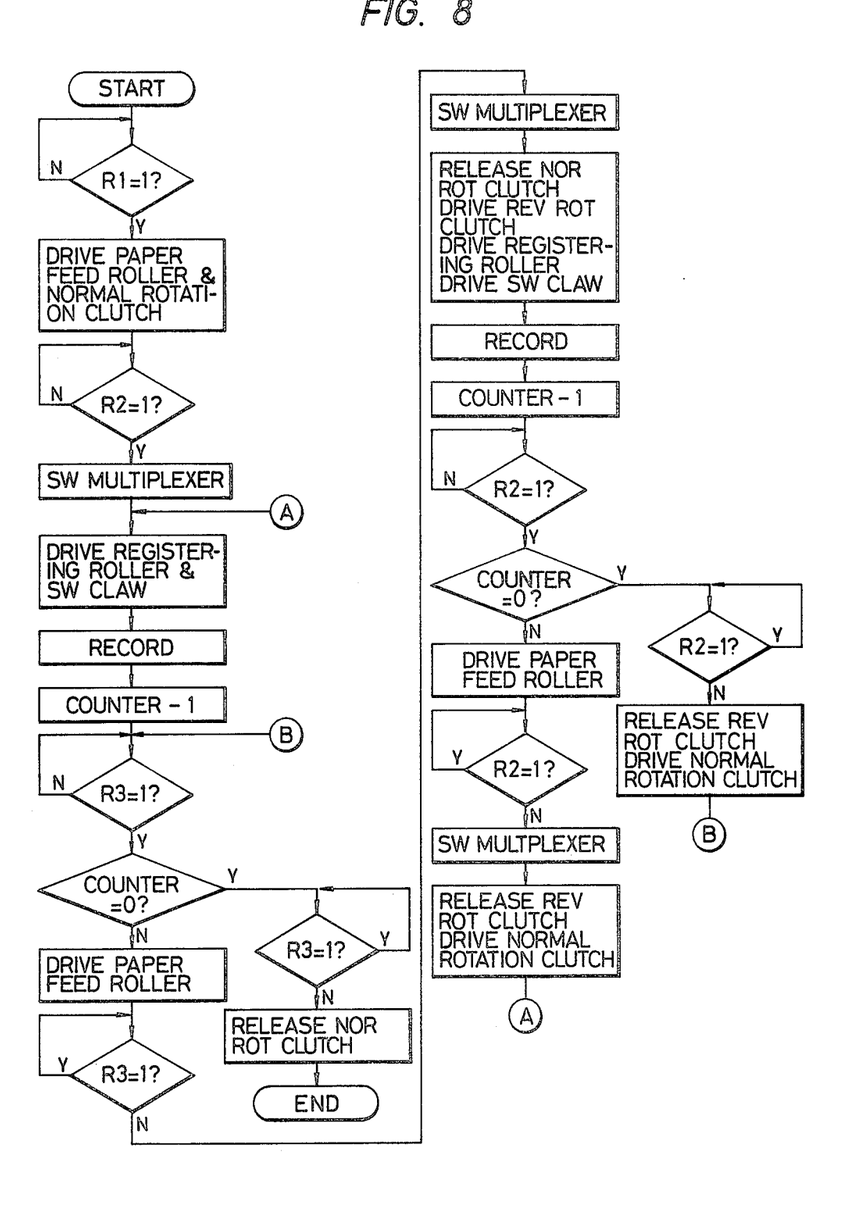
FIG. 8 is a flow chart showing the sequence control program for the control circuit shown in FIG. 7.

Said control unit 7-12 is composed of a one-chip microcomputer storing, in a read-only memory, sequence control programs as shown in FIG. 8 for the control of said recording and reading units, and controls various circuits in response to the original detection signals from the photosensors R1, R2 and R3, which respectively generate an H-level signal upon detection of the original. Said switching claw drive circuit 7-7 drives the switching claw 117 shown in FIG. 3. The normal rotation clutch drive circuit 7-8 causes the power of an unrepresented motor to be transmitted to rotate the original transport rollers 4, 4', 5, 5', 6 and 6' in normal direction. The reverse rotation clutch drive circuit 7-9 causes reverse rotation of said rollers. The registering roller drive circuit 7-10 activates an unrepresented motor for driving the registering roller 102. Also the feed roller drive circuit 7-11 activates an unrepresented motor for driving the sheet feed roller 52 for feeding the recording sheet 51.

The image signals from the image sensor 20 for reading the lower face of the original are converted into binary image signals by the A/D converter 7-1 and supplied to the multiplexers 7-3, 7-4. Also the image signals from the image sensor 21 for reading the upper face of the original are converted into binary image signals by the A/D converter 7-2 and supplied to said multiplexers 7-3, 7-4.

The multiplexer 7-3 supplies the head drive circuit 7-5 for driving the recording head 61 with the output signals from the A/D converter 7-1 or 7-2 respectively during the forward or backward scanning of the original. Similarly the multiplexer 7-4 supplies the head drive circuit 7-6 for driving the recording head 70 with the output signals from the A/D converter 7-2 or 7-1 respectively during the forward or backward scanning of the original.

As explained in the foregoing, the image reading unit of the present invention detects the completion of image reading on an original in displacement and inverts the displacing direction of said original in response to said detection for image reading also in said inverted displacement of the original.

The repeated image reading during reciprocating movement of the original eliminates the necessity of repeated manual feeding of the original, thus saving manpower and enabling high-speed image reading.

Although the reading unit in the foregoing embodiment is structured for reading the images on both faces of the original, it is naturally possible to apply this concept to a reading unit for reading only one face of the original.

Also the image recording apparatus of the present invention explained in the foregoing is essentially characterized by reciprocating image reading means for reading images on first and second faces of the original with line sensors, a first recording means for image recording on a first face of a recording sheet, and a second recording means positioned apart from said first recording means and adapted for image recording on a second face of the recording sheet, wherein the image information read from the first and second faces of the original is recorded respectively by said first and second recording means during the image reading in forward displacement of said original, while said information is recorded respectively by said second and first recording means during the image reading in backward displacement of said original.

The above-mentioned structure enables image recording on both faces of the recording sheet both in the forward and backward scanning function of the image reading means without the use of a memory for temporarily storing the scanned information, thus allowing one to provide a high-speed two-side image recording apparatus.

Also according to the present invention, the transport path for the recording sheet recorded during the forward scanning function of the image reading means is made different from that for the recording sheet recorded during the backward scanning function, and a sheet inverting mechanism is provided in either transport path, so that the recording sheets are always ejected with a single sheet direction and face direction regardless whether the image is read in the forward or backward direction.

The detecting means, composed of a light-emitting element and a photosensor employed in the foregoing embodiment, may be replaced by other suitable detectors such as a Hall effect element or a microswitch.

Figure 9:
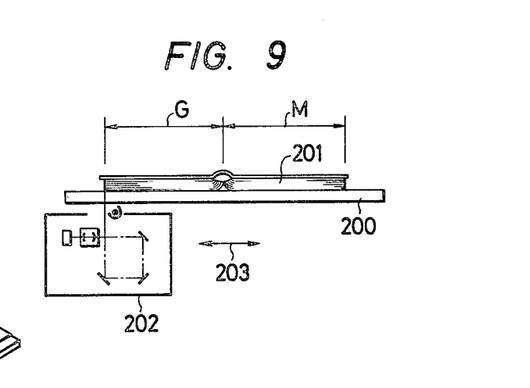
FIG. 9 is a cross-sectional view of another embodiment of the original reading unit capable of reciprocating image reading.

Furthermore, the reciprocating image reading unit in the foregoing embodiment, for displacing the sheet-shaped original document having images on both faces, may be replaced by an image reading unit with moving optical system as shown in FIG. 9, in which a bound original 201, placed on a platen 200 divided into areas G and H, is reciprocally read in the direction of arrow 203 by a reading unit 202. In such case the images of the areas G and H respectively correspond to the images on the first and second faces in the foregoing embodiment.

Figure 10:
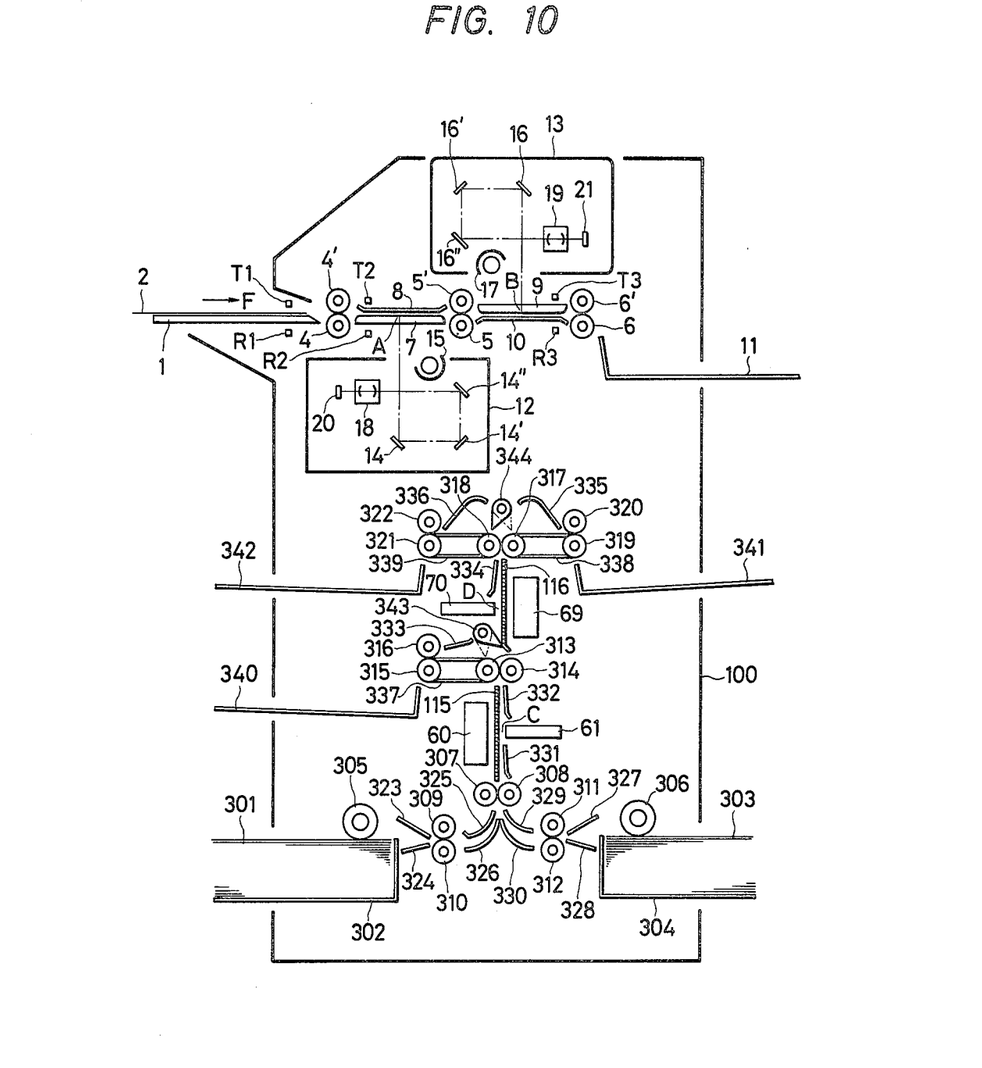
FIG. 10 is a cross-sectional view of another embodiment of an image recording apparatus capable of two-side recording.

FIG. 10 shows, in a cross-sectional view, an image recording apparatus provided with a reciprocating image reading unit and a recording unit capable of selectively using two-side recording sheets having special treatment on both faces and one-side recording sheets having special treatment on one face, according to the purpose of recording.

The image reading unit shown in FIG. 10 is identical with that shown in FIG. 2 and is therefore omitted from the following explanation. The recording unit for image recording in response to the image signals from said image reading unit comprises: two-side recording sheets 301; a two-side sheet cassette 302 containing said recording sheets 301; one-side recording sheets 303; a one-side sheet cassette 304 containing said recording sheets 303; a first feed roller 305 for feeding said two-side recording sheets 301; a second feed roller 306 for feeding said one-side recording sheets 303; registering rollers 307, 308 to be activated in synchronization with the original detection signal from the photocouple T2, R2 or T3, R3 for registering the image position; transport rollers 309, 310, 311, 312, 313, 314, 315, 316, 317, 318, 319, 320, 321, 322 for transporting the recording sheet 301 or 302; transport guides 323, 324, 325, 326, 217, 328, 329, 330, 331, 332, 333, 334, 335, 336 for facilitating the transportation of the recording sheet 301 or 303; conveyor belts 337, 338, 339 for transporting the recording sheet 301 or 303; a one-side sheet tray 340 for receiving one-side recording sheets 303 after image recording; a first two-side sheet tray 341 for receiving two-side recording sheets 301 recorded during the forward image reading; and a second two-side sheet tray 342 for receiving two-side recording sheets 301 recorded during the backward image reading.

Ink jet recording heads 61, 70 identical with those shown in FIG. 3 form images on the recording sheet 301 or 303, corresponding to the image signals from CCD line image sensors 20, 21 in the image reading unit. Said recording heads are so-called full-multi heads having an array of ink jet nozzles arranged over the full width in a direction substantially perpendicular to the advancing direction of the recording sheet 301 or 303.

Suction fans 60, 69 suck the recording sheets 301, 303 to perforated guide plates 115, 116 to maintain said sheets in a flat state and at an optimum distance from the recording head 61, 70.

Also there are shown first and second switching claws 343, 344 for selecting the transport paths to the aforementioned trays 340, 341, 342, and a casing 100 for housing said image reading unit and said recording unit. However said units may be housed in separate cases mutually connected electrically.

The function of the above-explained recording apparatus will be explained in the following. In case of two-side recording, the operator actuates an unrepresented key to displace the first switching claw 343 to the broken-lined position in order to guide the recording sheet through two recording heads. Upon detection of an inserted original 2 by the photocouple T1, R1, the first feed roller 305 and the transport rollers 309, 310 are activated to transport a two-side recording sheet 301 to the registering rollers 307, 308 through the guides 323, 324, 325 and 326. Then in response to the detection of the leading end of said original 2 by the photocouple T2, R2, the registering rollers 307, 308 initiate to rotate, thereby advancing said recording sheet 301 between the guide plate 115 and the guides 331, 332. Thus, at a position C, the recording head 61 records the image of the lower face of the original 2 on a first face of said recording sheet 301, in response to the image signals from the image sensor 20 for reading said lower face of the original.

At said recording the recording sheet 301, being sucked to the perforated guide plate 115 by the suction fan 60, is maintained flat and at a constant distance from the recording head 61. Thereafter the recording sheet 301 is further advanced by the transport rollers 313, 314 to a position D, where the recording head 70 records the image of the upper face of the original 2 onto a second face of the recording sheet 301, in response to the image signals from the image sensor 21 for reading said upper face of the original 2.

The distance between the image reading positions A and B is made equal to the distance between the recording positions C and D, so that the image recording can be effected without a memory for temporarily storing the image signals from said image sensor 20, 21.

The second switching claw 344 being in the full-lined position, the recording sheet 301 recorded on both faces during the image reading with forward original displacement in a direction F is transported along the conveyor belt 338 and the bent guide 335 and is ejected with the second face thereof upwards onto the first two-side sheet tray 341.

In the foregoing explained is the function of the recording apparatus during forward original displacement for image reading in the reading unit.

Then, the function of the recording apparatus during the backward original displacement in the reading unit is as follows.

In the foregoing procedure, upon detection of the leading end of the original 2 by the photocouple T3, R3, the feed roller 305 and the transport rollers 309, 310 are activated to advance a second two-side recording sheet 301 to the registering rollers 307, 308.

Then, in response to the detection of the trailing end of said original 2 by the photocouple T3, R3, said original transport rollers 4, 4', 5, 5', 6 and 6' initiate reverse rotation as explained in the foregoing. Simultaneously the upper switching claw 344 is shifted to the broken-lined position, and said registering rollers 307, 308 are activated to advance the recording sheet 301 to the recording position C, where the image on the upper face of the original 2 is recorded on the first face of said recording sheet 301. Subsequently, at the recording position D, the image on the lower face of the original 2 is recorded on the second face of said recording sheet 301. In this manner, in response to the trailing end detection signal from the photocouple T3, R3 indicating the switch-over from the forward to the backward displacement, the connections between the recording heads 61, 70 and the image sensors 20, 21 are mutually interchanged, whereby said recording heads 61, 70 respectively receive the image signals from the image sensors 21, 20. In a similar manner, in response to the trailing end detection signal from the photocouple T2, R2 indicating the change of original displacement from the backward to forward direction, said connections between the recording heads 61, 70 and the photosensors 20, 21 are returned to the original state.

As already explained in relation to FIGS. 4 and 5, the images formed in the forward image reading and in the backward image reading are mutually inverted with respect to the sheet direction and face direction.

Consequently, in the embodiment shown in FIG. 10, the upper second switching claw 344 is shifted to the broken-lined position for the recording sheet 301 recorded during the backward image reading, whereby such sheet is transported by the converyor belt 339, inverted by the bent guide 336 and ejected with the first face upwards onto the second two-side sheet tray 342. In this manner the recording sheets 301 recorded during the forward image reading are ejected on the first tray 341 while those recorded during the backward image reading are ejected on the second tray 342, so that all the sheets on each tray are aligned with respect to the image direction and face direction.

In case of image recording only on one face, the first switching claw 343 is shifted to the full-lined position by a corresponding instruction by the operator. Upon detection of the inserted original 2 by the photocouple T1, R1, the second feed roller 306 and the transport rollers 311, 312 for one-side recording are activated to advance a one-side recording sheet 303 from the cassette 304 to the registering rollers 307, 308 along the guides 327, 328, 329 and 330.

Then, in response to the detection of the leading end of the original 2 by the photocouple T2, R2, the registering rollers 307, 308 are activated to advance the recording sheet 303 to the recording position C, at which the recording head 61 records the image of the lower face of the original 2 onto the first face of said recording sheet 303.

Said first switching claw 343, positioned above the transport rollers 313, 314 and the conveyor belt 337 and already shifted to the full-lined position in this state, closes the transport path toward the recording position D and opens the transport path toward the conveyor belt 337, whereby the recording sheet 303 after image recording on the first face thereof is transported by the transport rollers 313, 314, then along the conveyor belt 337 and the guide 333 and ejected, with the first face upwards, onto the one-side sheet tray 340.

In this manner the selective use of the one-side recording sheet 303 and the two-side recording sheet 301 is by the presence of separate cassettes 304, 302 for said sheets and by selective feeding thereof from said cassettes. Such structure allows to reduce the running cost of the apparatus since one-side recording can be achieved with the relatively inexpensive one-side recording sheet 303.

The one-side recording in the backward image reading is effected in the following manner. In the course of preceding forward, in response to the detection of the trailing end of the original 2 by the photocouple T3, R3, the rollers 4, 4', 5, 5', 6 and 6' are inversely rotated and a second recording sheet 303 is advanced to the registering rollers 307, 308 in the same manner as explained in the foregoing. Then said registering rollers 307, 308 are activated at a determined time after the detection of the leading end of the original 2 in the backward displacement by the photocouple T3, R3. Since the image reading in the one-side recording is conducted at the point A also in the backward displacement of the original, the registering rollers are activated upon arrival of the leading end of the original in backward displacement at a position in front of the point A corresponding to the distance between said point A and the photocouple T2, R2.

Figure 11:
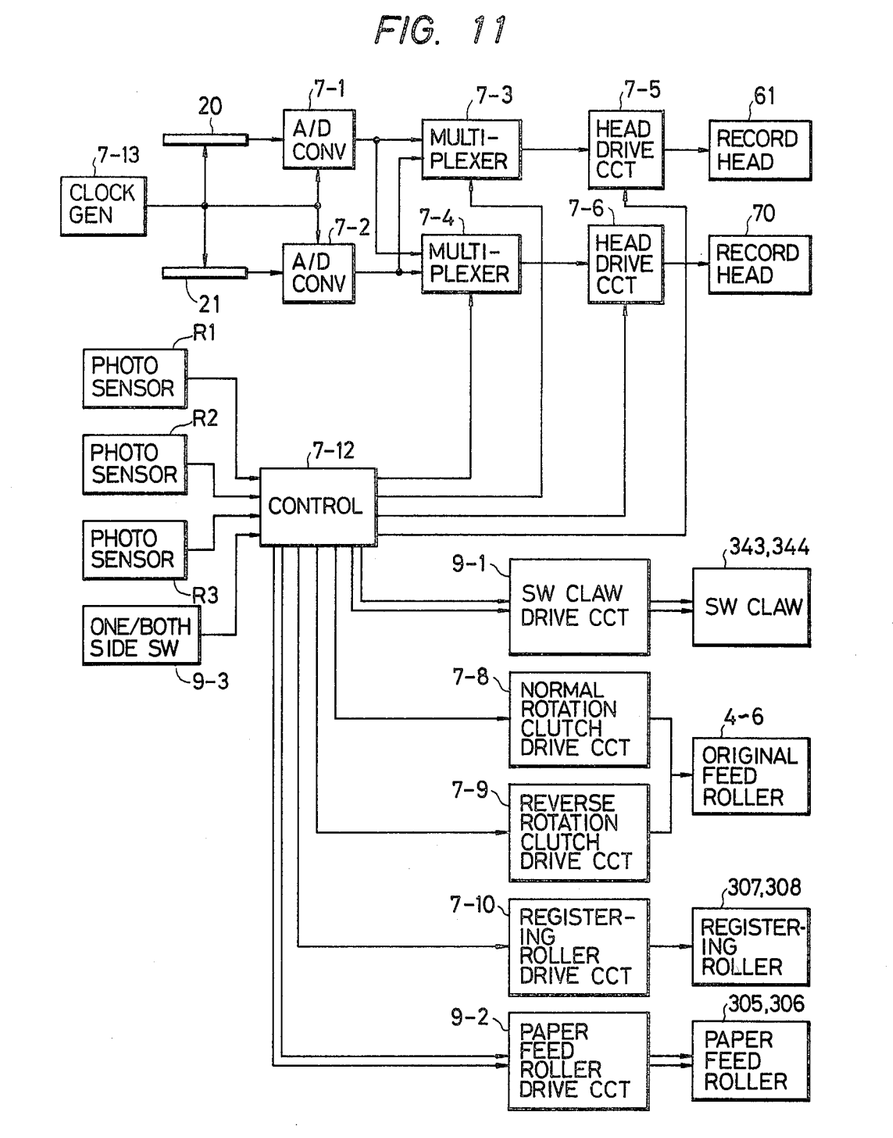
FIG. 11 is a block diagram of an embodiment of the control circuit for use in the recording apparatus shown in FIG. 10.
Figure 12A:
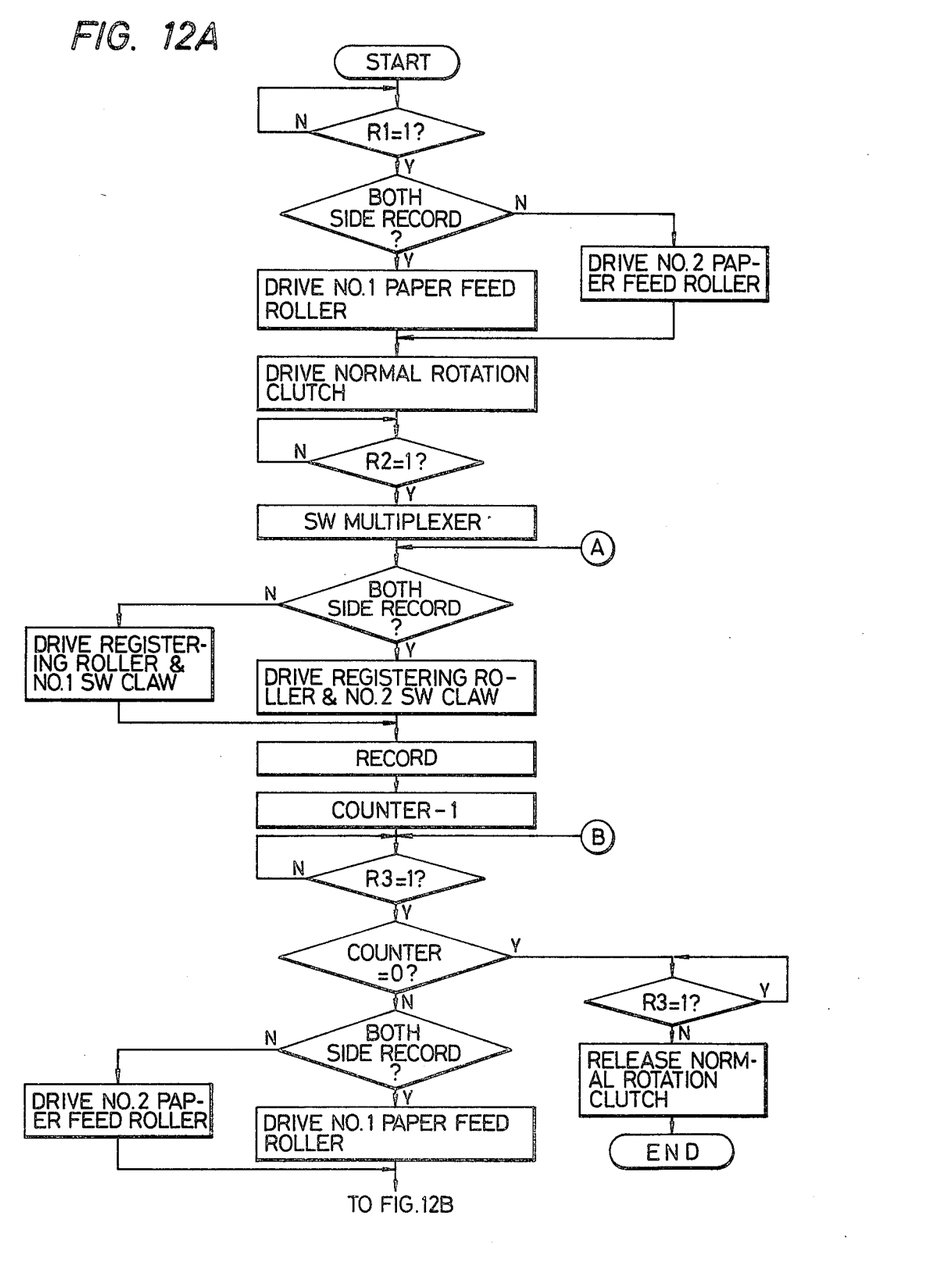
FIGS. 12(A) and 12(B) are flow charts showing the sequence control program for the recording apparatus shown in FIG. 10.
Figure 12B:
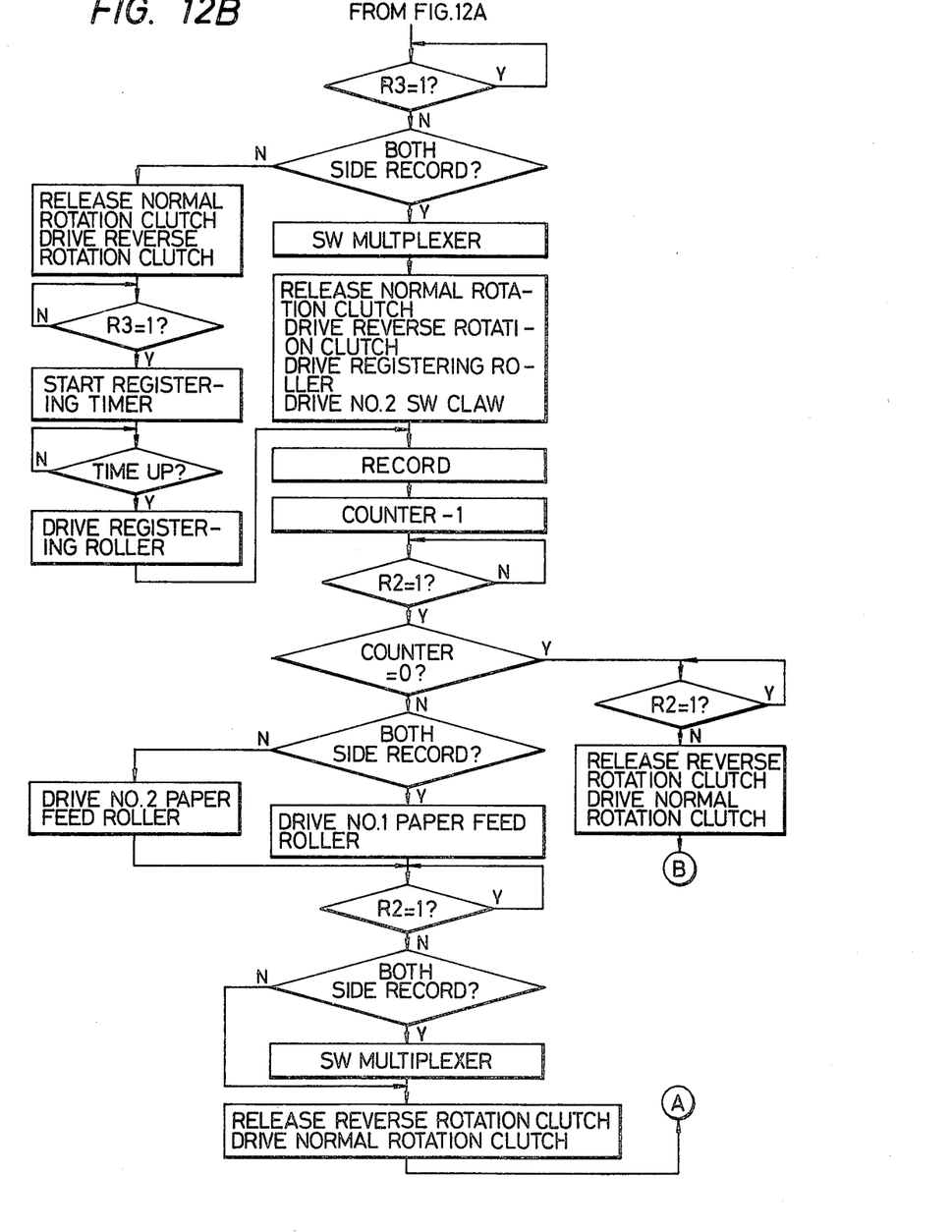

FIG. 11 is a block diagram showing an example of the control circuit adapted for use in the recording apparatus shown in FIG. 10, wherein a control circiut 7-12, composed for example of a one-chip microcomputer having sequence control stored programs as shown in FIG. 12 controls various circuits in response to a signal from a one/two side selector switch 9-3 and original detection signals from photosensors R1, R2 and R3. In FIG. 11 the components of the same functions as those shown in FIG. 7 are represented by same numbers and are omitted from the following explanation.

A switching claw drive circuit 9-11 controls the position of the first and second switching claws 343, 355. Also a feed roller drive circuit 9-2 controls motors for driving feed rollers 305, 306.

In the two-side recording mode, the multiplexer 7-3 supplies the head drive circuit 7-5 with the signals from the A/D converter 7-1 or 7-2 respectively during the forward image reading or backward image reading. Similarly the multiplexer 7-4 supplies the head drive circuit 7-6 with the signals from the A/D converter 7-2 or 7-1 respectively during the forward or backward image reading. Also in the one-side recording mode, the multiplexer 7-4 is turned off and the multiplexer 7-3 supplies the drive circuit 7-5 with the signals from the A/D converter 7-1 also during the backward image reading.

Consequently, in the embodiment explained above, the displacing direction of the original 2 is inverted in response to a detection signal from the photocouple T3, R3 indicating the completion of image reading by the image reading unit. In this manner it is rendered possible to eliminate the repeated manual insertion of the same original into the image reading unit and thus to achieve high-speed image reading operation.

The present invention is by no means limited to the aforementioned image reading unit for sheet originals but also is applicable to any image reading mechanisms for example an image reading unit for bound original as shown in FIG. 9. Also the detecting means composed of a light-emitting element and a photosensor may naturally be replaced by any suitable detector such as a Hall effect element of a microswitch.

As explained in the foregoing, the present invention allows selective use of the one-side recording sheet and two-side recording sheet by the presence of separate cassettes for said sheets and by the selective access thereto, thereby reducing the running cost through the use of relatively inexpensive one-side recording sheet for the one-side recording.

Also the use of a first tray for receiving the recording sheets recorded during the forward image reading and a second tray for receiving the recording sheets recorded during the backward image reading, selected by a selector actuated in response to the image reading direction, allows stacking of the recording sheets in aligned position, thereby facilitating the collating operation after image recording.

What I claim is:

1. An image recording apparatus comprising:
   image reading means for reading images on first and second faces of an original by relative displacement thereto in a first direction or in a second direction;
   first recording means for image recording on a first face of a recording sheet;
   second recording means for image recording on a second face of said recording sheet after passing said first recording means; and
   control means for causing said first and second recording means to record the image signals respectively of said first and second faces of the original read during said relative displacement in said first direction, and for causing said first and second recording means to record the image signals respectively of said second and first faces of the original read during said relative displacement in said second direction.

2. An image recording apparatus according to claim 1, wherein said image reading means is adapted to read images on the first and second faces of a single original in a single relative displacement.

3. An image recording apparatus according to claim 1, wherein said image reading means is adapted to read images of two different originals in a single relative displacement.

4. An image recording apparatus according to claim 1, wherein said image reading means is provided with means for transporting an original along a determined path, and is adapted to read images on the first and second faces of said original in different positions along said path.

5. An image recording apparatus according to claim 2, wherein said image reading means is provided with solid-state image sensors respectively for reading images on the first and second faces of the original.

6. An image recording apparatus according to claim 1, further comprising switching means for transmitting the image signals obtained from said image reading means to said first or second recording means.

7. An image reading device comprising:
transport means for transporting a sheet original;
image reading means for reading the image on said original during transportation by said transport means;
detecting means for detecting the completion of original image reading by said image reading means; and
control means for inverting the original transport direction of said transport means in response to a detection signal from said detecting means.

8. An image reading device according to claim 7, further comprising detecting means for detecting the original transported by said transport means.

9. An image reading device according to claim 7, wherein said transport means comprises rollers rotatable in both directions.

10. An image reading device according to claim 7, wherein said control means is adapted to control the number of inversions of transport direction according to a desired number of times of original reading.

11. An image recording apparatus comprising:
image reading means for reading an original image by relative displacement thereto in a first direction or in a second direction;
recording means for image recording on a recording sheet in response to image signals obtained from said image reading means;
inverting means for inverting the recording sheet recorded by said recording means; and
control means for activating said inverting means in response to the direction of said relative displacement of said image reading means.

12. An image recording apparatus according to claim 11, wherein said control means is adapted to control a switching member for guiding the recording sheet either to a first transport path in which said recording sheet is ejected after inversion or to a second transport path in which said recording sheet is ejected without inversion.

13. An image recording apparatus according to claim 11, further comprising a receiving member for receiving both the recording sheet inverted by said inverting means and the uninverted recording sheet.

14. An image recording apparatus comprising:
a transport path for transporting a recording sheet;
first recording means for image recording in response to image signals on a first face of said recording sheet during transportation thereof along said transport path; and
second recording means positioned in an opposed relationship to said first recording means across said transport path for image recording in response to image signals on a second face of said recording sheet during transportation thereof along said transport path.

15. An image recording apparatus according to claim 14, wherein the recording position of said first recording means is different from that of said second recording means.

16. An image recording apparatus according to claim 14, wherein said first and second recording means are respectively provided with means for maintaining flatness of the recording sheet.

17. An image recording apparatus according to claim 14, wherein each of said first and second recording means is an ink jet recording head having a full-line array of plural ink jet nozzles arranged in a direction substantially perpendicular to the transport direction of the recording sheet.

18. An image recording apparatus comprising:
a transport path for transporting a recording sheet;
first recording means for image recording on a first face of said recording sheet at a first position on said transport path;
second recording means for image recording on a second face of said recording sheet at a second position downstream of said first position along said transport path; and
mode selecting means for selecting either a two-side recording mode for image recording on said first and second faces of the recording sheet by said first and second recording means, or a one-side recording mode for image recording on one face only of said recording sheet.

19. An image recording apparatus according to claim 18, further comprising switching means for selecting either a first transport path for guiding the recording sheet from said first position to said second position, or a second transport path for ejecting said recording sheet bypassing said second position, wherein said mode selecting means is adapted to control said switching means in response to the selected mode.

20. An image recording apparatus according to claim 19, further comprising different receiving members respectively for receiving the recording sheet transported along said first transport path and the recording sheet transported along said second transport path.

21. An image recording apparatus comprising:
first image reading means for reading an image on a first face of an original;
second image reading means for reading an image on a second face of said original;
a transport path for transporting a recording sheet;
first recording means for image recording on a first face of said recording sheet at a first position on said transport path in response to the image signals from said first image reading means; and
second recording means for image recording on a second face of said recording sheet at a second position downstream of said first position along said transport path in response to the image signals from said second image reading means;
wherein the distance between said first and second image reading means is selected equal to the distance between said first and second positions.

22. An image recording apparatus according to claim 21, wherein each of said first and second image reading means is composed of a linear solid-state image sensor reading the original image by photoelectric conversion, and each of said first and second recording means is composed of an ink jet recording head having a full-line array of plural ink jet nozzles.

23. An image recording apparatus according to claim 21, further comprising means for transporting the original along a determined transport path, wherein said first and second image reading means are positioned along said transport path with said distance therebetween.

24. An image recording apparatus according to claim 21, wherein said first and second image reading means are adapted to read images on both faces of a single original.

25. An image recording apparatus comprising:
   selecting means for selecting either a first recording mode for image recording on both faces of a recording sheet or a second recording mode for image recording on one face of said recording sheet;
   first storage means for storing recording sheets for two-side recording;
   second storage means for storing recording sheets for one-side recording; and
   feed means for feeding said recording sheets either from said first storage means or from said second storage means in response to a recording mode selected by said mode selecting means.

26. An image recording apparatus according to claim 25, wherein said recording sheet for two-side recording is provided with a particular treatment for image recording on both faces thereof, and said recording sheet for one-side recording is provided with said particular treatment on only one face thereof.

27. An image recording apparatus according to claim 25, further comprising recording means for image recording on the recording sheet both in said first recording mode and in said second recording mode.

28. An image recording apparatus comprising:
   image reading means for reading an image on an original by relative displacement thereto in a first direction or in a second direction;
   recording means for image recording on a recording sheet in response to image signals obtained from said image reading means; and
   plural recording sheet receiving members for separately receiving the recording sheets recorded by said recording means according to the direction of said relative displacement of said image reading means.

29. An image recording apparatus according to claim 28, further comprising:
   plural transport paths for transporting the recording sheets recorded by said recording means to said plural receiving members; and
   a selecting member for guiding said recording sheets to either of said plural transport paths.

30. An image recording apparatus according to claim 28, wherein said recording sheets are stacked on said plural receiving members, with a face bearing a same image upwards.

* * * * *